United States Patent
Shiozaki et al.

(10) Patent No.: US 10,205,161 B2
(45) Date of Patent: *Feb. 12, 2019

(54) POSITIVE ELECTRODE FOR NONAQUEOUS ELECTROLYTE SECONDARY BATTERY AND NONAQUEOUS ELECTROLYTE SECONDARY BATTERY

(71) Applicant: Panasonic Corporation, Osaka (JP)

(72) Inventors: Tomoki Shiozaki, Osaka (JP); Kazuki Endo, Osaka (JP); Yasunari Sugita, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 479 days.

This patent is subject to a terminal disclaimer.

(21) Appl. No.: 14/941,186

(22) Filed: Nov. 13, 2015

(65) Prior Publication Data

US 2016/0190566 A1    Jun. 30, 2016

(30) Foreign Application Priority Data

Dec. 26, 2014 (JP) ................................ 2014-264557

(51) Int. Cl.
*H01M 4/36* (2006.01)
*H01M 4/485* (2010.01)
*H01M 4/66* (2006.01)
*H01M 4/02* (2006.01)

(52) U.S. Cl.
CPC .......... *H01M 4/366* (2013.01); *H01M 4/485* (2013.01); *H01M 4/661* (2013.01); *H01M 4/667* (2013.01); *H01M 2004/028* (2013.01)

(58) Field of Classification Search
CPC ...... H01M 4/366; H01M 4/661; H01M 4/667; H01M 4/485; H01M 2004/028
See application file for complete search history.

(56) References Cited

U.S. PATENT DOCUMENTS 5,871,863 A * 2/1999 Miyasaka ............. H01M 4/366
                                                      429/218.1

FOREIGN PATENT DOCUMENTS

| JP | 2003-157852 | 5/2003 |
| WO | 2005/089383 A2 | 9/2005 |

OTHER PUBLICATIONS

English Translation of Chinese Search Report dated Aug. 2, 2018 for the related Chinese Patent Application No. 201510694950.3.

* cited by examiner

*Primary Examiner* — Laura Weiner
(74) *Attorney, Agent, or Firm* — McDermott Will & Emery LLP

(57) ABSTRACT

A positive electrode for a nonaqueous electrolyte secondary battery according to an embodiment of the present disclosure includes a positive electrode current collector mainly composed of aluminum (Al), a protective layer disposed on the positive electrode current collector, and a positive electrode mixture layer containing a lithium-containing transition metal oxide and disposed on the protective layer. The protective layer has a thickness of 1 to 5 μm and contains an electroconductive material and an inorganic compound having an oxidation power lower than that of the lithium-containing transition metal oxide.

3 Claims, 2 Drawing Sheets

POSITIVE ELECTRODE FOR NONAQUEOUS ELECTROLYTE SECONDARY BATTERY AND NONAQUEOUS ELECTROLYTE SECONDARY BATTERY

BACKGROUND

1. Technical Field

The present disclosure relates to a positive electrode for a nonaqueous electrolyte secondary battery and a nonaqueous electrolyte secondary battery.

2. Description of the Related Art

Japanese Unexamined Patent Application Publication No. 2003-157852 (Patent Literature 1) discloses a positive electrode for a lithium battery including an aluminum oxide coating film having a thickness of 1 μm or less formed on the surface of an aluminum current collector. Patent Literature 1 describes that an aluminum oxide coating film having a thickness exceeding 1 μm is not sufficiently broken when the current collector and the positive electrode mixture layer are pressed in the thickness direction, resulting in a significant deterioration in the current collecting properties.

Incidentally, for example, an internal short circuit in a battery or exposure of a battery to high temperature may cause a redox reaction between a positive electrode active material and an aluminum current collector to cause large heat generation. Since the technology of Patent Literature 1 cannot increase the thickness of the aluminum oxide coating film, the heat generation due to such a redox reaction cannot be sufficiently prevented.

SUMMARY

In one general aspect, the techniques disclosed here feature a positive electrode for a nonaqueous electrolyte secondary battery, the positive electrode comprising a positive electrode current collector mainly composed of aluminum (Al), a protective layer disposed on the positive electrode current collector, and a positive electrode mixture layer containing a lithium-containing transition metal oxide and disposed on the protective layer. The protective layer has a thickness of 1 to 5 μm and contains an electroconductive material and an inorganic compound having an oxidation power lower than that of the lithium-containing transition metal oxide.

The positive electrode for a nonaqueous electrolyte secondary battery according to one aspect of the present disclosure can prevent heat generation due to a redox reaction between the positive electrode active material and the aluminum current collector, while maintaining satisfactory current collecting properties.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
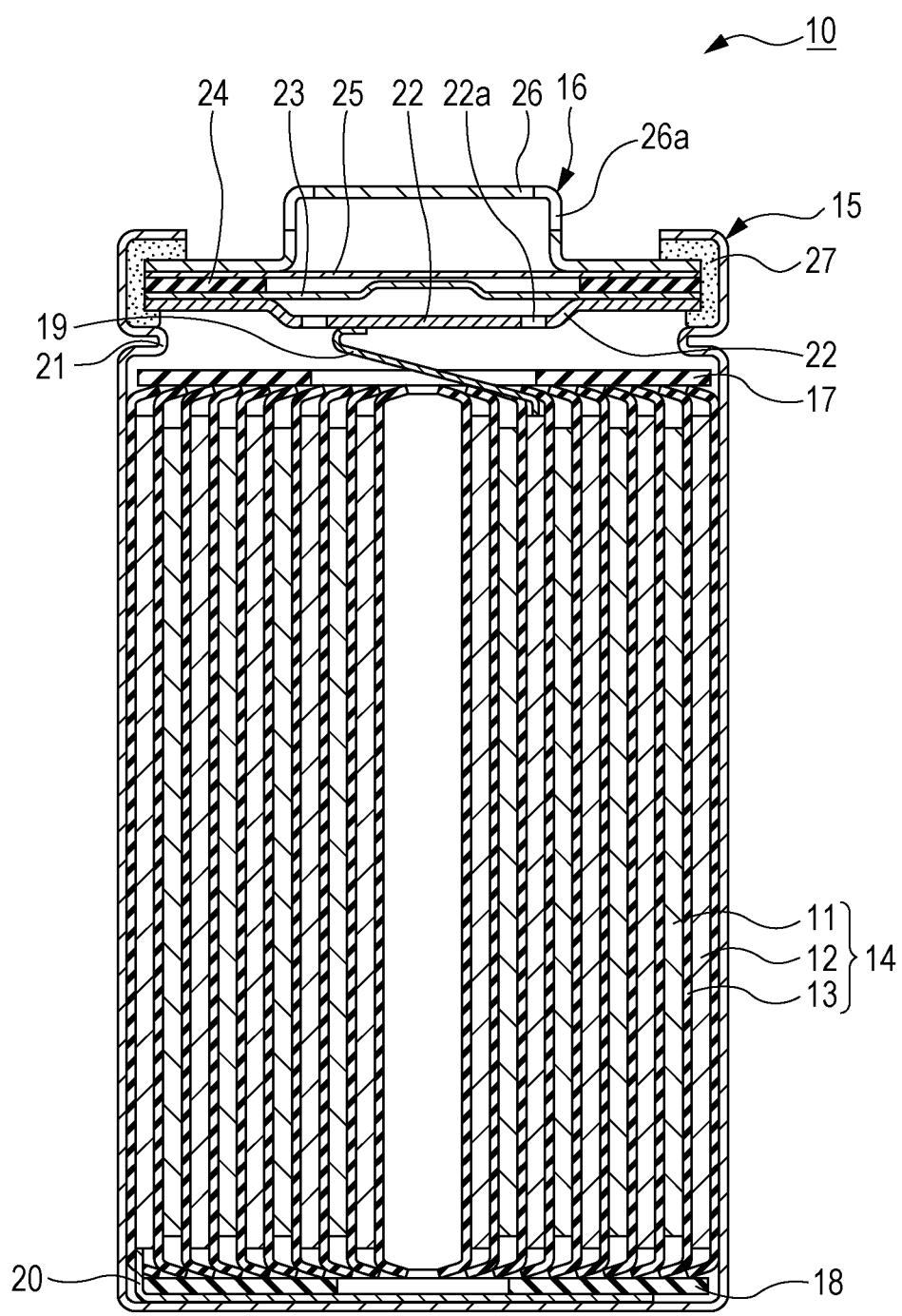
FIG. 1 is a cross-sectional view of a nonaqueous electrolyte secondary battery as an embodiment.

The positive electrode for a nonaqueous electrolyte secondary battery (hereinafter, simply referred to as "positive electrode") as an embodiment of the present disclosure includes a protective layer disposed on a current collector, the protective layer having a thickness of 1 to 5 μm and containing an electroconductive material and an inorganic compound having an oxidation power lower than that of a lithium-containing transition metal oxide serving as a positive electrode active material. The present inventors have found that, for example, an internal short circuit in a battery or exposure of a battery to high temperature has a risk of causing a redox reaction between the positive electrode active material (which is a lithium-containing transition metal oxide) and the aluminum current collector (which is mainly composed of aluminum) to cause large heat generation. The inventors have then developed a positive electrode including the above-described protective layer in order to prevent the heat generation by such a redox reaction. The protective layer containing an inorganic compound having an oxidation power lower than that of the lithium-containing transition metal oxide separates between the aluminum current collector and the lithium-containing transition metal oxide to prevent the redox reaction in which the aluminum current collector participates and thereby reduces the quantity of heat generated by occurrence of abnormality.

In order to prevent the redox reaction, the protective layer needs to have a thickness of at least 1 μm. The protective layer preferably has a thickness of 1.5 μm or more and is preferably formed so as to have a surface density of 0.1 to 20 g/m². A simple increase in the thickness of the protective layer significantly decreases the current collecting properties, as described in Patent Literature 1, to cause a deterioration in battery performance. The present inventors, however, have found that an addition of an electroconductive material to the protective layer can secure the current collecting properties. That is, the positive electrode as an embodiment of the present disclosure can prevent heat generation due to a redox reaction between the positive electrode active material and the aluminum current collector, while maintaining satisfactory current collecting properties.

An embodiment of the present disclosure will now be described in detail.

The drawings referred to in explanation of the embodiment are schematic, and the dimension ratios of components and other factors shown in the drawings may be different from those of actual one. Specific dimensional ratios and other factors should be judged from the following descriptions.

FIG. 1 is a cross-sectional view of a nonaqueous electrolyte secondary battery 10 as an embodiment.

The nonaqueous electrolyte secondary battery 10 includes a positive electrode 11, a negative electrode 12, and a nonaqueous electrolyte. A separator 13 is preferably provided between the positive electrode 11 and the negative electrode 12. The nonaqueous electrolyte secondary battery 10 has a structure, for example, in which a wound-type electrode assembly 14 produced by winding the positive electrode 11 and the negative electrode 12 with the separator 13 therebetween and the nonaqueous electrolyte are accommodated in a battery container. Instead of the wound-type electrode assembly 14, other electrode assemblies, such as a lamination-type electrode assembly composed of positive electrodes and negative electrodes alternately laminated with separators therebetween, may be employed. Examples of the battery container accommodating the electrode assembly 14 and the nonaqueous electrolyte include cylindrical, rectangular, coin, and button-shaped metal containers and resin containers (laminate-type batteries) formed by laminating resin sheets. In the example shown in FIG. 1, the battery container is composed of a bottomed cylindrical container body 15 and a sealing body 16.

The nonaqueous electrolyte secondary battery 10 includes insulating plates 17, 18 respectively disposed at the top and the bottom of the electrode assembly 14. In the example shown in FIG. 1, a positive electrode lead 19 is attached to the positive electrode 11, and a negative electrode lead 20 is attached to the negative electrode 12. The positive electrode lead 19 passes through a through-hole of the insulating plate 17 and extends to the sealing body 16 side, and the negative electrode lead 20 extends to the bottom side of the container body 15 through the outside of the insulating plate 18. For example, the positive electrode lead 19 is connected, by, for example, welding, to the lower surface of a filter 22 serving as the basal plate of the sealing body 16, and thereby a cap 26 serving as the top plate of the sealing 16 to which the filter 22 is electrically connected functions as a positive electrode terminal. The negative electrode lead 20 connected, by, for example, welding, to the inner surface of the bottom of the container body 15, and thereby the container body 15 functions as a negative electrode terminal. In the embodiment, the sealing body 16 is provided with a current interruption device (CID) and a gas discharge mechanism (safety valve). The bottom of the container body 15 is also preferably provided with a gas discharge valve (not shown).

The container body 15 is, for example, a bottomed cylindrical metal container. A gasket 27 is disposed between the container body 15 and the sealing body 16 to secure the sealing performance of the battery container. The container body 15 preferably has a protrusion part 21 that is formed by, for example, pressing the side wall from the outside and supports the sealing body 16. The protrusion part 21 is preferably formed in a ring shape along the circumferential direction of the container body 15 and supports the sealing body 16 with the upper surface thereof.

The sealing body 16 includes a filter 22 having a filter opening 22a and a valve element disposed on the filter 22. The valve element occludes the filter opening 22a of the filter 22 and is broken when the inner pressure of the battery is increased by heat generation due to an internal short circuit or another reason. In the embodiment, the sealing body includes a lower valve element 23 and an upper valve element 25 as the valve elements, and also includes an insulating member 24 disposed between the lower valve element 23 and the upper valve element 25 and a cap 26 having a cap opening 26a. Each member constituting the sealing body 16 has, for example, a disk or ring-like shape, and the members excluding the insulating member 24 are electrically connected to one another. Specifically, the filter 22 and the lower valve element 23 are bonded to each other at the periphery thereof, and the upper valve element 25 and the cap 26 are also bonded to each other at the periphery thereof. The lower valve element 23 and the upper valve element 25 are connected to each other at the central portion thereof, and the insulating member 24 is disposed between the lower valve element 23 and the upper valve element 25 at the periphery thereof. If the inner pressure is increased by heat generation due to an internal short circuit or another reason, for example, the lower valve element 23 has a small thickness and is broken. As a result, the upper valve element 25 expands towards the cap 26 side and separates from the lower valve element 23 to break the electrical connection between them.

[Positive Electrode]

Figure 2:
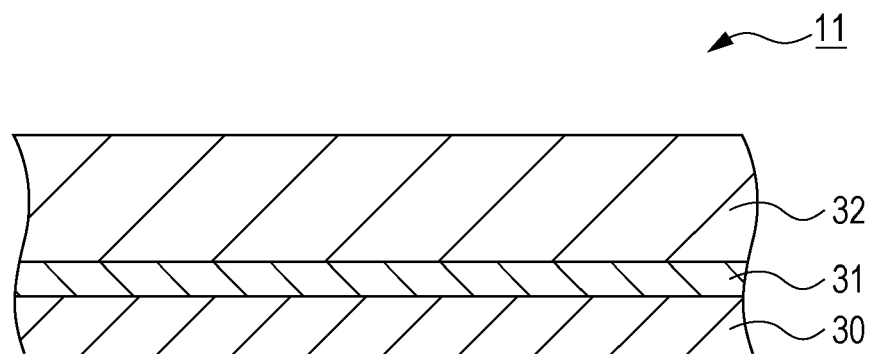
FIG. 2 is a cross-sectional view of a positive electrode for a nonaqueous electrolyte secondary battery as an embodiment.

FIG. 2 is a cross-sectional view of a positive electrode 11 as an embodiment.

The positive electrode 11 includes a positive electrode current collector 30 mainly composed of aluminum (A), a protective layer 31 disposed on the positive electrode current collector 30, and a positive electrode mixture layer 32 containing a lithium-containing transition metal oxide and disposed on the protective layer 31. Here, the term "being mainly composed" refers to that the proportion of the material is the highest among the materials. The positive electrode mixture layer 32 contains the lithium-containing transition metal oxide as a positive electrode active material and preferably further contains an electroconductive material and a binding material. The positive electrode 11 can be produced by, for example, applying a positive electrode mixture slurry containing a positive electrode active material, a binding material, and other materials onto each protective layer 31 formed on a positive electrode current collector 30; drying the coating films; and then performing rolling. Thus, a positive electrode mixture layer 32 is formed on both surfaces of the current collector.

In the positive electrode current collector 30, for example, aluminum or an aluminum alloy is used. The content of aluminum in the positive electrode current collector 30 is 50% or more, preferably 70% or more, and more preferably 80% or more, based on the total weight of the current collector. The positive electrode current collector 30 is, for example, metal foil made of aluminum or an aluminum alloy and having a thickness of about 10 to 100 μm.

The positive electrode active material is, for example, a lithium-transition metal oxide containing a transition metal element such as Co, Mn, or Ni. Examples of the lithium-transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$). These lithium-transition metal oxides may be used alone or as a mixture of two or more thereof.

The electroconductive material contained in the positive electrode mixture layer 32 enhances the electrical conductivity of the positive electrode mixture layer. Examples of the electroconductive material include carbon materials such as carbon black (CB), acetylene black (AB), Ketjen black, and graphite. These electroconductive materials may be used alone or in combination of two or more thereof.

The binding material contained in the positive electrode mixture layer 32 functions so as to maintain the good contact between the positive electrode active material and the electroconductive material and to enhance the binding property of, for example, the positive electrode active material to the surface of the positive electrode current collector. Examples of the binding material include fluororesins, such as polytetrafluoroethylene (PTFE) and polyvinylidene fluoride (PVdF), polyacrylonitrile (PAN), polyimide resins, acrylic resins, and polyolefin resins. These resins may be used in combination with, for example, carboxymethyl cellulose (CMC) or its salt (which is, for example, CMC-Na, CMC-K, or $CMC-NH_4$ or may be a partially neutralized salt) or polyethylene oxide (PEO). These binding materials may be used alone or in combination of two or more thereof.

The positive electrode 11 includes a protective layer 31 between the positive electrode current collector 30 and the positive electrode mixture layer 32, as described above. The protective layer 31 separates between the positive electrode current collector 30 mainly made of aluminum and the lithium-transition metal oxide serving as the positive electrode active material and prevents the redox reaction in which the positive electrode current collector 30 participates.

The protective layer 31 has a thickness of 1 to 5 μm and contains an inorganic compound (hereinafter, referred to as "inorganic compound P") having an oxidation power lower than that of the lithium-containing transition metal oxide contained in the positive electrode mixture layer 32 and also contains an electroconductive material. Since the protective layer 31 contains the electroconductive material in addition to the inorganic compound P, the positive electrode 11 can secure good current collecting properties. The inorganic compound P is, for example, particles having an average particle diameter (volume-average particle diameter measured by a light scattering method) of 1 μm or less. The protective layer 31 preferably contains a binding material for securing its mechanical strength by binding the inorganic compound P and the electroconductive material and for enhancing the binding property between the protective layer 31 and the positive electrode current collector 30.

Preferred examples of the inorganic compound P include inorganic oxides, such as manganese oxide, silicon dioxide, titanium dioxide, and aluminum oxide. In particular, aluminum oxide is preferred. The content of the inorganic compound P is preferably 70% to 99.8% by weight and particularly preferably 90% to 99% by weight based on the total weight of the protective layer 31. A content of the inorganic compound P within the above-mentioned range enhances the effect of preventing the redox reaction to easily reduce the quantity of heat generated by occurrence of abnormality.

The protective layer 31 is formed on the positive electrode current collector 30, preferably so as to have a surface density of 0.1 to 20 g/m$^2$. A protective layer 31 having a surface density within this range can sufficiently prevent contact between the positive electrode current collector 30 and the lithium-transition metal oxide to easily reduce the quantity of heat generated by occurrence of abnormality. The protective layer 31 is particularly preferably formed so as to have a thickness of 1.5 to 5 μm and a surface density of 1 to 10 g/m$^2$. The protective layer 31 can be formed by, for example, applying a slurry containing an inorganic compound P, an electroconductive material, and a binding material onto a positive electrode current collector 30; and drying the coating film. When the positive electrode mixture layer 32 is provided on both surfaces of the positive electrode current collector 30, the protective layer 31 is also provided on both surfaces of the positive electrode current collector 30.

The electroconductive material contained in the protective layer 31 can be the same type as that of the electroconductive material applied to the positive electrode mixture layer 32, for example, can be a carbon material such as carbon black (CB), acetylene black (AB), Ketjen black, or graphite. These electroconductive materials may be used alone or in combination of two or more thereof. The content of the electroconductive material is preferably 0.1% to 20% by weight and particularly preferably 1% to 10% by weight, based on the total weight of the protective layer 31. The content rate of the electroconductive material in the protective layer 31 is higher than that of the electroconductive material in, for example, the positive electrode mixture layer 32.

The binding material contained in the protective layer 31 can be the same type as that of the electroconductive material applied to the positive electrode mixture layer 32, for example, can be a fluororesin such as polytetrafluoroethylene (PTFE) or polyvinylidene fluoride (PVdF), polyacrylonitrile (PAN), a polyimide resin, an acrylic resin, or a polyolefin resin. These binding materials may be used alone or in combination of two or more thereof. The content of the binding material is preferably 0.1% to 20% by weight and particularly preferably 1% to 10% by weight, based on the total weight of the protective layer 31.

[Negative Electrode]

The negative electrode is composed of a negative electrode current collector of, for example, metal foil and a negative electrode mixture layer disposed on the current collector. The negative electrode current collector can be, for example, metal foil that is stable in the potential range of the negative electrode, such as copper, or a film having a surface layer of such a metal. The negative electrode mixture layer preferably contains a binding material, in addition to a negative electrode active material. The negative electrode can be produced by, for example, applying a negative electrode mixture slurry containing a negative electrode active material, a binding material, and other materials onto a negative electrode current collector; drying the coating film; and then performing rolling. Thus, a negative electrode mixture layer is formed on both surfaces of the current collector.

The negative electrode active material may be any material that can reversibly occlude and discharge lithium and can be, for example, a carbon material, such as natural graphite or artificial graphite; a material alloying with lithium, such as silicon (Si) or tin (Sn); or an alloy or complex oxide containing a metal element such as Si or Sn. The negative electrode active materials may be used alone or in combination of two or more thereof.

The binding material contained in the negative electrode mixture layer can be, as in the negative electrode, a fluororesin, PAN, a polyimide resin, an acrylic resin, or a polyolefin resin. In the case of using an aqueous solvent for preparing the negative electrode mixture slurry, for example, styrene-butadiene rubber (SBR), CMC or its salt, polyacrylic acid (PAA) or its salt (which is, for example, PAA-Na or PAA-K or may be a partially neutralized salt), or polyvinyl alcohol (PVA) is preferably used.

[Separator]

The separator used is a porous sheet having ionic permeability and insulation properties. Examples of the porous sheet include micro-porous thin films, woven fabric, and non-woven fabric. Preferred materials of the separator are, for example, olefin resins, such as polyethylene and polypropylene, and cellulose. The separator may be a laminate including a cellulose fiber layer and a thermoplastic resin fiber layer made of, for example, a olefin resin. The separator may be a multilayer separator including a polyethylene layer and a polypropylene layer or may have a surface onto which an aramid resin is applied.

A filler layer containing an inorganic filler may be disposed between the separator and the positive electrode and/or between the separator and the negative electrode. Examples of the inorganic filler include oxides containing at least one selected from titanium (Ti), aluminum (Al), silicon (Si), and magnesium (Mg); and phosphate compounds. The filler layer can be formed by, for example, applying a slurry containing the filler onto the surface of the positive electrode, negative electrode, or separator.

[Nonaqueous Electrolyte]

The nonaqueous electrolyte includes a nonaqueous solvent and an electrolyte salt dissolved in the nonaqueous solvent. The nonaqueous electrolyte is not limited to liquid electrolytes (nonaqueous electrolytic solutions) and may be a solid electrolyte, such as gelled polymers. Examples of the nonaqueous solvent include esters, ethers, nitriles such as acetonitrile, amides such as dimethylformamide, and solvent mixtures of two or more thereof. The nonaqueous solvent may contain a halogen-substituted derivative having at least a part of hydrogen atoms of the solvent substituted with halogen atoms such as fluorine atoms.

Examples of the esters include cyclic carbonate esters, such as ethylene carbonate (EC), propylene carbonate (PC), and butylene carbonate; chain carbonate esters, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters, such as γ-butyrolactone and γ-valerolactone; and chain carboxylate esters, such as methyl acetate, ethyl acetate, propyl acetate, methyl propionate (MP), ethyl propionate, and γ-butyrolactone.

Examples of the ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ether; and chain ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferred examples of the halogen-substituted derivative include fluorinated cyclic carbonate esters, such as fluoroethylene carbonate (FEC); fluorinated chain carbonate esters; and fluorinated chain carboxylate esters, such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n=1 or 2), $LiB_{10}Cl_{10}$, LiCl, LiBr, LiI, chloroborane lithium, lower aliphatic lithium carboxylate, borates such as $Li_2B_4O_7$ and $Li(B(C_2O_4)F_2)$, and imides such as $LiN(SO_2CF_3)_2$ and $LiN(C_lF_{2l+1}SO_2)(C_mF_{2m+1}SO_2)$ (where, l and m each represent an integer of 1 or more). Lithium salts may be used alone or as a mixture of two or more thereof. Among these lithium salts, from the viewpoint of ionic conductivity, electrochemical stability, and other factors, $LiPF_6$ is preferably used. The concentration of the lithium salt is preferably 0.8 to 1.8 mol per 1 L of the nonaqueous solvent.

EXAMPLES

The present disclosure will now be more specifically described by Examples, but is not limited to the following Examples, Example 1

Production of Positive Electrode

Aluminum oxide ($Al_2O_3$, 93.5 parts by weight), acetylene black (AB, 5 parts by weight), and polyvinylidene fluoride (PVdF, 1.5 parts by weight) were mixed, and the mixture was further mixed with an appropriate amount of N-methyl-2-pyrrolidone (NMP) to prepare a slurry. The slurry was then applied onto both surfaces of a positive electrode current collector of aluminum foil having a thickness of 15 μm, and drying is performed to form a protective layer having a thickness of 3.0 μm and a surface density of 5.0 g/m$^2$.

Lithium-containing transition metal oxide (97 parts by weight) represented by $LiNi_{0.5}Co_{0.2}Mn_{0.3}O_2$ and serving as a positive electrode active material, acetylene black (AB, 2 parts by weight), and polyvinylidene fluoride (PVdF, 1 part by weight) were mixed, and an appropriate amount of N-methyl-2-pyrrolidone (NMP) was added to the mixture to prepare a positive electrode mixture slurry. The positive electrode mixture slurry was then applied to the surfaces of the protective layers formed on the positive electrode current collector, followed by drying. The resulting product was cut into a prescribed electrode size and was rolled with a roller to produce a positive electrode composed of the positive electrode current collector provided with a protective layer and a positive electrode mixture layer in this order on both surfaces.

[Production of Negative Electrode]

A graphite powder (98.7 parts by weight), carboxymethyl cellulose (CMC, 0.7 parts by weight), and styrene-butadiene rubber (SBR, 0.6 parts by weight) were mixed, and an appropriate amount of water was further added to the mixture to prepare a negative electrode mixture slurry. The negative electrode mixture slurry was then applied onto both surfaces of a negative electrode current collector of copper foil, followed by drying. The resulting product was cut into a prescribed electrode size and was rolled with a roller to produce a negative electrode composed of the negative electrode current collector provided with a negative electrode mixture layer on both surfaces.

[Production of Nonaqueous Electrolyte]

Ethylene carbonate (EC), ethyl methyl carbonate (EMC), and dimethyl carbonate (DMC) were mixed at a volume ratio of 3:3:4. $LiPF_6$ was dissolved in this solvent mixture at a concentration of 1.2 mol/L to prepare a nonaqueous electrolytic solution.

[Production of Battery]

An aluminum lead and a nickel lead were attached to the positive electrode and the negative electrode, respectively. The positive electrode and the negative electrode were spirally wound with a polyethylene separator therebetween to produce a wound electrode assembly. The electrode assembly was accommodated in a bottomed cylindrical battery container body having an outer diameter of 18.2 mm and a height of 65 mm, and the nonaqueous electrolytic solution prepared above was poured therein. The opening of the battery container body was then sealed by the gasket and a sealing body to produce 18650-type cylindrical nonaqueous electrolyte secondary battery A1.

Example 2

Battery A2 was produced as in Example 1 except that the protective layer had a thickness of 1.5 μm and a surface density of 2.5 g/m$^2$.

Example 3

Battery A3 was produced as in Example 1 except that the protective layer had a thickness of 1.0 µm and a surface density of 1.6 g/m².

Example 4

Battery A4 was produced as in Example 1 except that the weight ratio of the constituent materials of the protective layer was aluminum oxide/electroconductive material/binding material=50/45/5 and that the protective layer had a thickness of 5.0 µm and a surface density of 5.0 g/m².

Comparative Example 1

Battery B1 was produced as in Example 1 except that the protective layer was not formed.

Comparative Example 2

Battery B2 was produced as in Example 1 except that the electroconductive material was not added to the protective layer and that the amount of the aluminum oxide was increased instead of the electroconductive material.

Comparative Example 3

Battery B3 was produced as in Example 1 except that the protective layer had a thickness of 0.5 µm and a surface density of 0.7 g/m².

[Measurement of Battery Capacity]

The battery capacity of each battery produced above was measured by the following procedure:

Each battery was charged with a constant current of 0.3 It (600 mA) to a battery voltage of 4.2 V at an environmental temperature of 25° C. and was then charged at a constant voltage of 4.2 V. Subsequently, each battery was discharged at a constant current of 0.3 It (600 mA) until the battery voltage reached 3.0 V. The discharging capacity on this occasion was determined as the battery capacity.

[Measurement of Internal Resistance]

The internal resistance of each battery produced above was measured by the following procedure:

Each battery was charged with a constant current of 0.3 It (600 mA) to a battery voltage of 4.2 V at an environmental temperature of 25° C. and was then charged at a constant voltage of 4.2 V. Subsequently, the interterminal resistance of each battery was measured with a low-resistance meter (at a measurement frequency of 1 kHz by an AC four-probe method). The resistance value on this occasion was determined as the internal resistance.

[Nail Sticking Test]

Each battery was tested by the following procedure:

(1) Each battery was charged with a constant current of 0.3 C (600 mA) to a battery voltage of 4.2 V at an environmental temperature of 25° C. and was then continuously charged at a constant voltage of 4.2 V until a current value of 0.05 C (90 mA).

(2) The tip of a wire nail having a diameter of 3 mm was brought into contact with the central portion of the side face of the battery charged in the step (1) under an environment of a temperature of 25° C. The wire nail was stuck into the battery at a rate of 10 mm/sec along the diameter direction, and the sticking was stopped when the wire nail completely pierced the battery.

(3) The battery temperature was measured at a position 10 mm apart from the central portion of the side face of the battery at which the wire nail was stuck to determine the highest temperature of the battery.

TABLE 1

| Battery | Protective layer | | | Battery characteristics | | Nail sticking test Highest temperature of battery (° C.) |
|---|---|---|---|---|---|---|
| | Surface density (g/m²) | Thickness (µm) | Weight ratio Al₂O₃/AB/PVdF | Battery capacity (mAh) | internal resistance (mΩ) | |
| A1 | 5.0 | 3.0 | 93.5/5/1.5 | 1556 | 15.7 | 586 |
| A2 | 2.5 | 1.5 | 93.5/5/1.5 | 1568 | 15.5 | 622 |
| A3 | 1.6 | 1.0 | 93.5/5/1.5 | 1570 | 15.5 | 654 |
| A4 | 5.0 | 5.0 | 50/45/5 | 1545 | 15.4 | 711 |
| B1 | — | — | — | 1582 | 15.2 | 744 |
| B2 | 5.0 | 3.0 | 98.5/0/1.5 | 1122 | 54.7 | 551 |
| B3 | 0.7 | 0.5 | 93.5/5/1.5 | 1580 | 15.3 | 741 |

The results shown in Table 1 demonstrate that in the batteries of Examples each including a protective layer containing aluminum oxide and an electroconductive material and having a thickness of 1 to 5 µm and a surface density of 1.6 to 5.0 g/m² on the aluminum current collector of the positive electrode, the heat generation by occurrence of abnormality such as nail sticking is drastically prevented. This result is probably caused by that the protective layer prevents the redox reaction between the positive electrode active material (which is the lithium-containing transition metal oxide) and the aluminum current collector.

In addition, the batteries of Examples have battery capacities and internal resistances similar to those of the battery (Comparative Example 1) not including any protective layer. That is, it is understood that the battery characteristics, such as battery capacity and internal resistance, are not deteriorated even if the protective layers are disposed as in Examples. However, in a protective layer not containing any electroconductive material (Comparative Example 2) or having a small thickness of 0.5 urn (Comparative Example 3) cannot simultaneously achieve satisfactory battery characteristics and heat generation-preventing effect. In the former case, a reduction in the battery capacity and an increase in the internal resistance occur. In the latter case, the effect of preventing heat generation due to occurrence of abnormality is low. That is, satisfactory battery characteristics and high heat generation-preventing effect can be simultaneously achieved only when a protective layer is employed as in Examples.

What is claimed is:

1. A positive electrode for a nonaqueous electrolyte secondary battery, the positive electrode comprising:
   a positive electrode current collector;
   a protective layer disposed on the positive electrode current collector; and
   a positive electrode mixture layer containing a lithium-containing transition metal oxide and disposed on the protective layer, wherein:
   the protective layer has a thickness of 1 µm to 5 µm and contains an electroconductive material and an inorganic compound having an oxidation power lower than that of the lithium-containing transition metal oxide, the protective layer is a mixture of electroconductive material, the inorganic compound and a binding material, and
   the protective layer is formed on the positive electrode current collector at a surface density of 0.1 $g/m^2$ to 20 $g/m^2$.

2. A positive electrode for a nonaqueous electrolyte secondary battery, the positive electrode comprising:
   a positive electrode current collector;
   a protective layer disposed on the positive electrode current collector; and
   a positive electrode mixture layer containing a lithium-containing transition metal oxide and disposed on the protective layer, wherein:
   the protective layer has a thickness of 1 µm to 5 µm and contains an electroconductive material and an inorganic compound having an oxidation power lower than that of the lithium-containing transition metal oxide, and
   the protective layer further contains a binding material in an amount of 0.1% to 10% by weight based on the total weight of the protective layer.

3. A positive electrode for a nonaqueous electrolyte secondary battery, the positive electrode comprising:
   a positive electrode current collector;
   a protective layer disposed on the positive electrode current collector; and
   a positive electrode mixture layer containing a lithium-containing transition metal oxide and disposed on the protective layer, wherein:
   the protective layer has a thickness of 1 µm to 5 µm and contains an electroconductive material and an inorganic compound having an oxidation power lower than that of the lithium-containing transition metal oxide, and
   the protective layer is a mixture of the electroconductive material, the inorganic compound and a binding material.

* * * * *